UNITED STATES PATENT OFFICE.

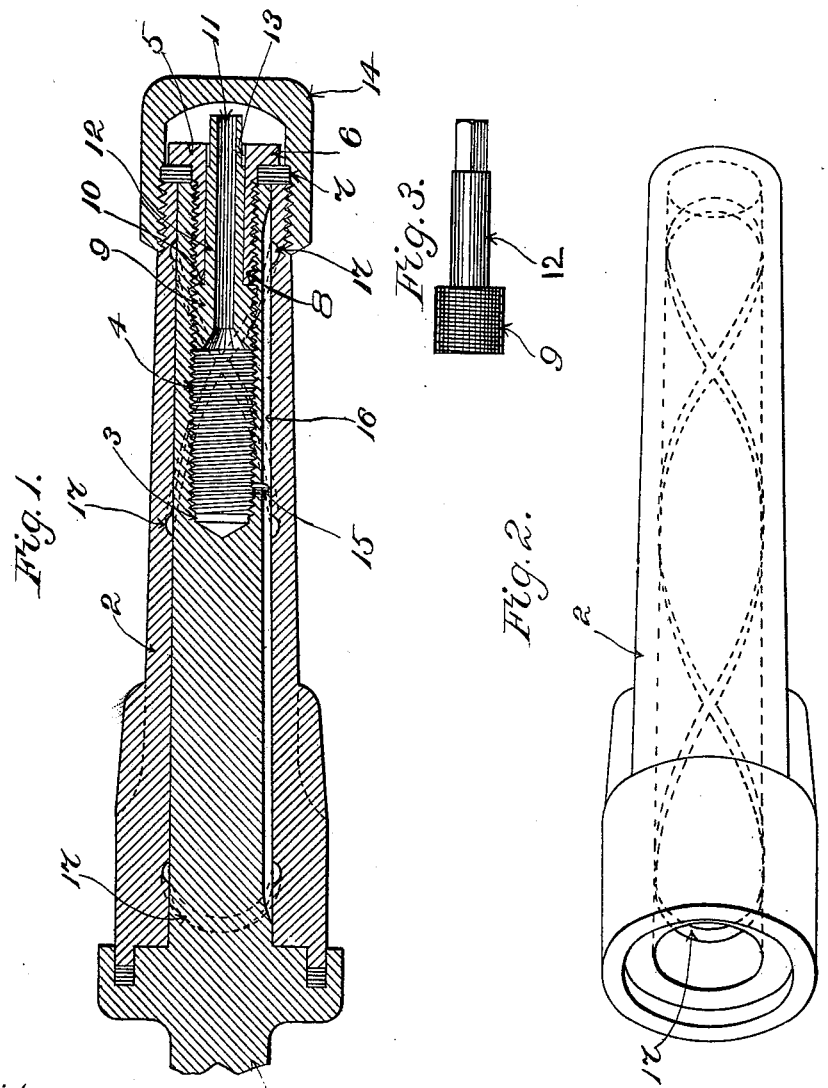

ISAAC OSGOOD, OF AMESBURY, MASSACHUSETTS.

AXLE-BEARING.

SPECIFICATION forming part of Letters Patent No. 630,556, dated August 8, 1899.

Application filed March 13, 1899. Serial No. 708,810. (No model.)

*To all whom it may concern:*

Be it known that I, ISAAC OSGOOD, a citizen of the United States, residing at Amesbury, in the county of Essex and State of Massachusetts, have invented certain new and useful Improvements in Axle-Bearings, of which the following is a specification, reference being had therein to the accompanying drawings.

Figure 1 of the drawings shows in central longitudinal horizontal section an axle and axle-box embodying the features of my present invention. Fig. 2 is an isometric of the axle-box. Fig. 3 shows the jam-screw in elevation.

The invention will be described first with reference to the said drawings, after which the characteristic features thereof will be particularly pointed out in the claims at the close hereof.

In the drawings, 1 designates the axle, and 2 the axle-box. The axle is hollowed out lengthwise from its outer end, the interior space forming a central bore or chamber 3, suitable for containing lubricant. The inner surface of the shell of the said bore or chamber 3 is screw-threaded, as at 4.

5 designates the nut by which the axle-box is held in place on the axle. Its outer end is flanged, as at 6, to enable it to hold the axle-box in place, packing 7 being interposed, as customary, between the flange and the end of the axle-box. The body 8 of the said nut is threaded and screws into the outer end of the bore or chamber 3 in the axle. For the purpose of locking the nut after it has been adjusted or set to take up play or backlash between the axle and axle-box, I employ a jam-screw 9, which is characterized by being interiorly contained, it occupying a portion of the bore or chamber 3 inside the inner end of the nut 5 and there making engagement with an interior portion of the chambered part of the axle. The said jam-screw, it coöperating with the axle and the nut 5, is further characterized by taking endwise bearing against one of said parts and having a screw-thread engaging with the other thereof—that is to say, reference being had to the drawings, the shoulder 10 of the said screw bears against the inner end of the nut, while the thread of the exterior of the jam-screw takes into the thread 4 of the inner surface of the bore or chamber 3. Within certain limits the arrangement of parts and the manner of securing the interengagement of the same may vary. For convenience in introducing a quantity of lubricant into the chamber 3 the jam-screw itself is made with a central passage-way 11, extending lengthwise thereof to the outer end of the jam-screw. In order to enable the jam-screw to be turned when required, the stem 12 of the said jam-screw is shown extended through the central opening 13 of the nut 5, which is represented as made tubular. The outer end of the said stem is suitably adapted for being engaged by a suitable tool for turning the jam-screw. Herein the said outer end is shown made polygonal. 14 designates a cap screwing onto the outer end of the axle-box 2 and inclosing the parts at the outer ends thereof.

One or more holes 15 lead from the chamber 3 of the axle to the exterior of the axle, preferably at the rear side of the latter, where they communicate with a groove 16, formed in the surface of the axle and extending lengthwise thereof.

The lubricant which finds its way from chamber 3 out through the hole or holes 15 to the groove 16 in the exterior of the axle serves to lubricate the contacting surfaces of the axle and axle-box. In order to occasion complete and perfect distribution of the lubricant along such contacting surfaces and maintain a constant circulation of the lubricant while the parts are in use, I form the interior surface of the axle-box of one or more continuous or endless spiral grooves, as 17. (See more particularly Fig. 2.) Very many forms of grooves for effecting distribution of lubricant have been tried in practice heretofore with different degrees of success. I do not therefore wish to be understood as seeking to cover herein, broadly, the use of such grooves. My invention consists especially in the particular and specific form of the groove or grooves 17—that is to say, in accordance with my invention the groove 17, beginning at any given point in the course thereof, winds continuously around the interior of the axle-box, passing in a slow spiral along the length thereof as far as the groove is desired to extend, then almost imperceptibly changing its direction and by a gradual curve without angle or other abrupt break returning upon itself. In its return course the groove again winds spirally about the inner surface of the axle-box to the opposite return-bend, usually intersecting the first portion of its course one or more times. The said opposite return-bend is like the one first described in that it is formed with a gradual curve and change of direction. The groove 17 thus traced is continuous and endless, and in the revolution of the axle-box upon the stationary axle the supply of lubricant will be led first along the axle in one direction to and around the one return-bend and then in the reverse direction along the axle to and around the other reverse bend, and so on uninterruptedly, it traveling continuously and smoothly in an onward direction within the groove.

It will be noted that the endless spiral groove 17 is entirely within the ends of the axle-box, in that it does not extend to or is not cut through the end walls of said box. This is an important feature of the invention and results in decided advantages, in that the groove is thus a closed one, so that the lubricant circulating therein cannot escape from the said groove except onto the axle to be lubricated, and thus objectionable outflow of the lubricant is avoided. Furthermore, and perhaps more important still, this closed endless spiral groove, while affording proper facility for the back-and-forth circulation of the lubricant, does not permit of the admission of dirt or grit to the bearing at the ends of the axle-box, as is liable to occur with the use of oil-distributing grooves which extend to or are open at the ends of the axle-boxes.

I claim as my invention—

1. The combination with the axle having the central bore and the internal screw-thread, as at 4, the nut having the screw-threaded body fitted within the said bore, and the interiorly-contained jam-screw occupying a portion of the said bore inside the inner end of the nut and there making engagement with a portion of the axle, the said jam-screw taking endwise bearing against one of said parts and having a screw-thread engaging with the other thereof, of the axle-box held in place by the said nut, substantially as described.

2. The combination with the axle having the central bore constituting a chamber for containing lubricant, and having also the internal screw-thread, as at 4, the nut having the screw-threaded body fitted within the outer portion of the said bore, and the interiorly-contained jam-screw occupying a portion of the said bore inside the inner end of the nut and itself having a central passage through which lubricant may be introduced into the said chamber, of the axle-box held in place by the said nut, substantially as described.

3. The combination with the axle having the central bore and the internal screw-thread, as at 4, the tubular nut having the screw-threaded body fitted within the said bore, and the interiorly-contained jam-screw occupying a portion of the said bore inside the inner end of the nut and there making engagement with a portion of the axle, the stem of the said jam-screw extending lengthwise through the tubular nut and being shaped at its outer end for engagement by a tool to turn the same, of the axle-box held in place by the said nut, substantially as described.

4. The combination with the axle having the central bore constituting a chamber for containing lubricant, and having also the internal screw-thread, as at 4, the tubular nut having the screw-threaded body fitted within the said bore, and the interiorly-contained jam-screw occupying a portion of the said bore inside the inner end of the nut and there making engagement with a portion of the axle, the jam-screw itself having a central passage through which lubricant may be introduced into the said chamber, the stem of the jam-screw extending lengthwise through the tubular nut and being shaped at its outer end for engagement by a tool to turn the same, of the axle-box held in place by the said nut, substantially as described.

5. The combination with the stationary axle, of the axle-box having the continuous or endless, lubricant-distributing groove 17 leading first in one direction along the axle-box and then in the opposite direction, and winding with a slow spiral continuously around the interior surface of the same, the said groove being entirely within the ends of the said axle-box so as to be closed, as stated, and the said groove returning upon itself at each extremity of its course and having each of its return-bends formed by a gradual curve and change of direction of the groove, substantially as described.

In testimony whereof I affix my signature in presence of two witnesses.

ISAAC OSGOOD.

Witnesses:
  CHAS. F. RANDALL,
  WILLIAM A. COPELAND.